(12) United States Patent
Frijas et al.

(10) Patent No.: US 9,809,207 B2
(45) Date of Patent: Nov. 7, 2017

(54) VEHICLE CONTROL SYSTEM

(71) Applicant: Honda Motor Co., Ltd., Tokyo (JP)

(72) Inventors: Rodney M. Frijas, Powell, OH (US);
Rob S. Zimmerman, West Liberty, OH (US); Chad D. Raymond, Dublin, OH (US); Jason A. Sovern, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 15/051,091

(22) Filed: Feb. 23, 2016

(65) Prior Publication Data
US 2017/0240150 A1    Aug. 24, 2017

(51) Int. Cl.
*B60T 8/175*    (2006.01)

(52) U.S. Cl.
CPC .................................. *B60T 8/175* (2013.01)

(58) Field of Classification Search
None
See application file for complete search history.

(56) References Cited

U.S. PATENT DOCUMENTS

| | | |
|---|---|---|
| 4,864,504 A | 9/1989 | Koshizawa et al. |
| 4,967,869 A | 11/1990 | Nagaoka et al. |
| 5,083,631 A | 1/1992 | Nakayama et al. |
| 5,125,490 A | 6/1992 | Suzumura et al. |
| 5,803,197 A | 9/1998 | Hara et al. |
| 5,947,224 A | 9/1999 | Kouno |
| 5,978,726 A | 11/1999 | Takeda et al. |
| 5,979,619 A | 11/1999 | Rump |
| 5,984,429 A | 11/1999 | Nell et al. |
| 6,155,956 A | 12/2000 | Hayashi |
| 6,166,631 A | 12/2000 | Kennedy et al. |
| 6,189,643 B1 | 2/2001 | Takahashi et al. |
| 6,260,934 B1 | 7/2001 | Lee |
| 6,338,398 B1 | 1/2002 | Eguchi |
| 6,351,698 B1 | 2/2002 | Kubota et al. |
| 6,434,469 B1 | 8/2002 | Shimizu et al. |
| 6,510,911 B1 | 1/2003 | Satou et al. |
| 6,533,081 B2 | 3/2003 | Totsuka et al. |
| 6,547,344 B2 | 4/2003 | Hada et al. |

(Continued)

OTHER PUBLICATIONS

Video: Luft, A.: How Does Hill Hold Assist Work on the 2012 Chevy Sonic? http://gmauthority.com/blog/2011/08/how-does-hill-hold-assist-work-on-the-2012-chevy-sonic-video/, Aug. 30, 2011, printed Mar. 2, 2015.

(Continued)

*Primary Examiner* — Jonathan M Dager
*Assistant Examiner* — Garrett F Evans
(74) *Attorney, Agent, or Firm* — Rankin, Hill & Clark LLP

(57) ABSTRACT

A Brake Traction Control System (BTCS) for an off-road type vehicle includes a 2WD/4WD switch adapted to switch a drive mode of the vehicle between a two-wheel drive mode (2WD) and a four-wheel drive mode (4WD). The switch is configured to be manually activated by an associated vehicle operator. A control unit is in signal communication with the 2WD/4WD switch. The control unit is operable to activate the BTCS only if the drive mode is switched to the four-wheel drive mode and predetermined vehicle operating conditions relating to engine throttle position or opening and wheel speed are subsequently satisfied.

14 Claims, 3 Drawing Sheets

(56) References Cited

U.S. PATENT DOCUMENTS

| | | |
|---|---|---|
| 6,575,583 B2 | 6/2003 | Suzuki et al. |
| 6,616,572 B2 | 9/2003 | Suzuki |
| 6,618,662 B2 | 9/2003 | Schmitt et al. |
| 6,679,810 B1 | 1/2004 | Boll et al. |
| 6,748,311 B1 | 6/2004 | Walenty et al. |
| 6,796,399 B2 | 9/2004 | Satou et al. |
| 6,814,414 B1 | 11/2004 | Schmitt et al. |
| 6,986,687 B2 | 1/2006 | Möll |
| 7,000,998 B2 | 2/2006 | Hano et al. |
| 7,002,454 B1 | 2/2006 | Gustafson |
| 7,047,120 B2 | 5/2006 | Perach et al. |
| 7,074,161 B2 | 7/2006 | Diebold et al. |
| 7,134,985 B2 | 11/2006 | Watanabe et al. |
| 7,206,682 B2 | 4/2007 | Bodin et al. |
| 7,264,077 B2 | 9/2007 | Mori et al. |
| 7,374,255 B2 | 5/2008 | Mori |
| 7,383,910 B2 | 6/2008 | Mori et al. |
| 7,399,040 B2 | 7/2008 | Schmidt |
| 7,401,873 B2 | 7/2008 | Werner |
| 7,444,221 B2 | 10/2008 | Yamada et al. |
| 7,444,224 B2 | 10/2008 | Sadano et al. |
| 7,463,964 B2 | 12/2008 | Ushiroda et al. |
| 7,484,816 B2 | 2/2009 | Maruyama et al. |
| 7,502,676 B2 | 3/2009 | Ono et al. |
| 7,516,007 B2 | 4/2009 | Tamai et al. |
| 7,556,587 B2 | 7/2009 | Jiang et al. |
| 7,600,827 B2 | 10/2009 | Tamai et al. |
| 7,641,291 B2 | 1/2010 | Streit et al. |
| 7,752,992 B2 | 7/2010 | Takeshige et al. |
| 7,762,633 B2 | 7/2010 | Maskell et al. |
| 7,762,926 B2 | 7/2010 | Peterson |
| 7,779,953 B2 | 8/2010 | Perakes et al. |
| 7,806,218 B2 | 10/2010 | Kubo |
| 7,810,601 B2 | 10/2010 | Hamrin et al. |
| 7,914,589 B2 | 3/2011 | Yamamoto et al. |
| 7,934,589 B2 | 5/2011 | Groner et al. |
| 8,033,955 B2 | 10/2011 | Farnsworth |
| 8,224,548 B2 | 7/2012 | Ludwig et al. |
| 8,275,520 B2 | 9/2012 | Sokoll et al. |
| 8,352,126 B2 | 1/2013 | Blaise et al. |
| 8,412,436 B2 | 4/2013 | Mallet et al. |
| 8,463,520 B2 | 6/2013 | Febrer et al. |
| 8,483,926 B2 | 7/2013 | Shiozawa et al. |
| 8,489,304 B2 | 7/2013 | Noguchi et al. |
| 8,505,669 B2 | 8/2013 | Ueda et al. |
| 8,543,303 B2 | 9/2013 | Marcus |
| 8,565,994 B2 | 10/2013 | Mallet |
| 8,579,765 B2 | 11/2013 | Yu et al. |
| 8,600,596 B2 | 12/2013 | Claeys et al. |
| 8,649,948 B2 | 2/2014 | Yanagida et al. |
| 8,678,978 B2 | 3/2014 | Kim et al. |
| 8,717,158 B2 | 5/2014 | Roach |
| 8,751,102 B2 | 6/2014 | Valascho et al. |
| 8,833,870 B2 | 9/2014 | Kish et al. |
| 8,838,357 B2 | 9/2014 | Watanabe |
| 8,841,995 B2 | 9/2014 | Jayamohan et al. |
| 8,855,880 B2 | 10/2014 | Rowker et al. |
| 8,874,344 B2 | 10/2014 | Aldighieri et al. |
| 8,965,609 B2 | 2/2015 | Takagi |
| 2005/0001481 A1 | 1/2005 | Kley et al. |
| 2005/0067896 A1 | 3/2005 | Kim et al. |
| 2005/0140208 A1 | 6/2005 | Ji |
| 2006/0079377 A1 | 4/2006 | Steen et al. |
| 2008/0090688 A1* | 4/2008 | Torres ............... B60K 17/20 475/35 |
| 2012/0166055 A1 | 6/2012 | Ozawa |
| 2013/0162010 A1 | 6/2013 | Koyama et al. |
| 2014/0135168 A1 | 5/2014 | Yokoo |
| 2014/0297141 A1 | 10/2014 | Nihanda et al. |
| 2014/0297150 A1 | 10/2014 | Ohyagi et al. |
| 2014/0330497 A1 | 11/2014 | Beger |
| 2015/0066339 A1 | 3/2015 | Hoare et al. |

OTHER PUBLICATIONS

2014 Ford Escape Owner's Manual © 2013 Ford Motor Company, pp. 138-139.

Hill Holder Function, http://www.subarumanuals.org/subaru-807.html, printed Mar. 4, 2015, 3 pages.

Jeep JK Hill Start Assist On/Off Guide, Jeeps on Trails, http://www.jeepsontrails.com/hillstartassistonoff/, printed Mar. 4, 2015, 11 pages.

Honda Indicator Lights, http://www.collegeparkhonda.com/HondaIndicatorLights.html, printed Mar. 4, 2015, 2 pages.

Nissan Newsroom, May 6, 2014, http://www.newsroom.nissaneurope.com/EU/engb/Media/Media.aspx?mediaid=117998, printed Mar. 4, 2015, 5 pages.

Ford Transit Quick Reference Guide, © 2013 Ford Motor Company, p. 8, 14 pages.

2014 Buick Encore Owners Manual, p. 15, http://www.buick.com/content/dam/Buick/north_america/usa/nscwebsite/en/home/owners/vehicle_manuals/2015/02_pdf/GTK_2015_Enclave_23121150_A.pdf, 16 pages.

Auto Adapt AB, Aug. 2005, http://s3-eu-west-1.amazonaws.com/sharedlive.toyotaretail.co.uk/chapter-assets/motability/downloads/Carospeed_Eng_aug_05.pdf, 2 pages.

"Starting and Operating/Hill start assist system", Subaru Impreza Manuals 2014 Impreza Owner/-Es Manual—p. 7-35 and 36, 2 pages.

Patterson King, "Stanley Subaru | What does this light on my dashboard mean? DEEP Dive (moving parts and lights)", p. 5, Oct. 30, 2014, http://www.stanleysubaru.com/blog/2014/october/30/whatdoesthislightonmydashboardmeandeepdivemovingpartsandlights.htm, 11 pages.

"Toyota RAV4: Hillstart assist control", http://www.csuvs.com/hill_start_assist_control5661.html, printed Mar. 4, 2015, 4 pages.

Toyota Tacoma Owners Manual: Driving assist systems, http://www.ttguide.net/driving_assist_systems74.html, printed Mar. 4, 2015, 6 pages.

Office Action of U.S. Appl. No. 15/051,066 dated Jun. 30, 2017, 23 pages.

* cited by examiner

VEHICLE CONTROL SYSTEM

BACKGROUND

A variety of control systems are provided on a vehicle for control of drive configurations or characteristics of the vehicle. One such control system is a hill start assist (HSA) system. As is well know, the HSA system automatically maintains a vehicle brake when the vehicle is located on a hill as the vehicle is traveling below some predetermined minimum speed value. Typical HSA systems will maintain the vehicle stationary while the vehicle is on a grade to permit the vehicle operator to start the vehicle in a desired direction of travel while preventing the vehicle from rolling in the opposite direction. Many HSA systems include a variety of inputs for actuating and deactivating the system (e.g., lateral and longitudinal acceleration sensors for detecting vehicle speed and vehicle position angle). Another type of vehicle control system is a brake traction control system (BTCS). This control system controls driving force distribution between wheels according to driving conditions of the vehicle.

Control of drive configurations or characteristics of off-road type vehicle (e.g., all-terrain vehicle, multi-utility vehicle, side-by-side vehicle and other types of like utility vehicles) can be unique to such vehicles. Such vehicles are often capable of being driven over uneven or hilly terrains, and therefore the known HSA systems that are automatically operable based on sensed vehicle position angle can limit HSA usability in off-road conditions. Such vehicles are also often capable of encountering soft, loose or slippery soils as well as snow and/or ice and optimum drive characteristics can vary from rear wheel drive (where only the rear wheels provide traction), front and rear wheel drive (sometime referred to as four wheel drive where the rear wheels and at least one of the front wheels provide traction), and all wheel drive (where the rear wheels and both front wheels provide traction). In some known off-road type vehicles, the operator can manually select the drive configuration (e.g., from rear wheel drive to four wheel drive) which in turn can impact driving force distribution between the front wheels and the rear wheels when terrain surface friction is different between the front and rear wheels.

BRIEF DESCRIPTION

In accordance with one aspect, a brake traction control system (BTCS) for an off-road type vehicle operable in one of a two-wheel drive mode (2WD) and a four-wheel drive mode (4WD) comprises a 2WD/4WD switch adapted to switch a drive mode of the vehicle between a two-wheel drive mode (2WD) and a four-wheel drive mode (4WD). The switch is configured to be manually activated by an associated vehicle operator. A control unit is in signal communication with the 2WD/4WD switch. The control unit is operable to activate the BTCS only if the drive mode is switched to the four-wheel drive mode and predetermined vehicle operating conditions relating to engine throttle position or opening and wheel speed are subsequently satisfied.

In accordance with another aspect, a method for selectively activating and controlling a Brake Traction Control System (BTCS) for an off-road type vehicle operable in one of a two-wheel drive mode (2WD) and a four-wheel drive mode (4WD) comprises providing a manually operable 2WD/4WD switch having a first state for front-wheel drive (2WD) mode and a second state for four-wheel drive (4WD) mode and determining whether the 2WD/4WD switch is in the second state for four-wheel drive (4WD) mode. Wherein only if the vehicle is in the four-wheel drive (4WD) mode, the method further comprises detecting throttle position or opening of an engine, and comparing the detected throttle position or opening with a predetermined throttle position or opening; calculating wheel speed for each of left wheels and right wheels, and comparing wheel speed between the left wheels and the right wheels; and activating the BTCS only if the detected throttle position or opening is greater than or equal to the predetermined throttle position or opening and a wheel speed delta between the left wheels and right wheels is greater than a target wheel speed delta setting for the vehicle.

In accordance with yet another aspect, an off-road type vehicle operable in one of a two-wheel drive mode (2WD) and a four-wheel drive mode (4WD) comprises an engine and a drive line for transferring a driving force of the engine to left and right front wheels via a front differential and to left and right rear wheels via a rear differential. A manual 2WD/4WD switch is adapted to switch a drive mode of the vehicle between a two-wheel drive mode (2WD) and a four-wheel drive mode (4WD). A control unit is configured to control the driving force distributed to the rear wheels by selectively engaging or connecting the rear differential. The control unit is in communication with the 2WD/4WD switch such that when the switch is manually actuated to switch the drive mode to the four-wheel drive mode (4WD) the rear differential is engaged and engine torque is distributed to both the front wheels and the rear wheels. The control unit includes a Brake Traction Control System (BTCS) that is selectively activated only if the drive mode is manually switched to the four-wheel drive mode.

DETAILED DESCRIPTION

It should, of course, be understood that the description and drawings herein are merely illustrative and that various modifications and changes can be envisioned without departing from the present disclosure. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like. Moreover, the term "approximately" as used herein means a reasonable amount of deviation of the modified word is contemplated such that the end result is not significantly changed. For example, such term can be construed as allowing a deviation of at least 5% of the modified word if this deviation would not negate the meaning of the word this term of degree modifies. It will also be appreciated that the various identified components of the exemplary vehicle control systems disclosed herein are merely terms of art that may vary from one manufacturer to another and should not be deemed to limit the present disclosure.

Figure 1:
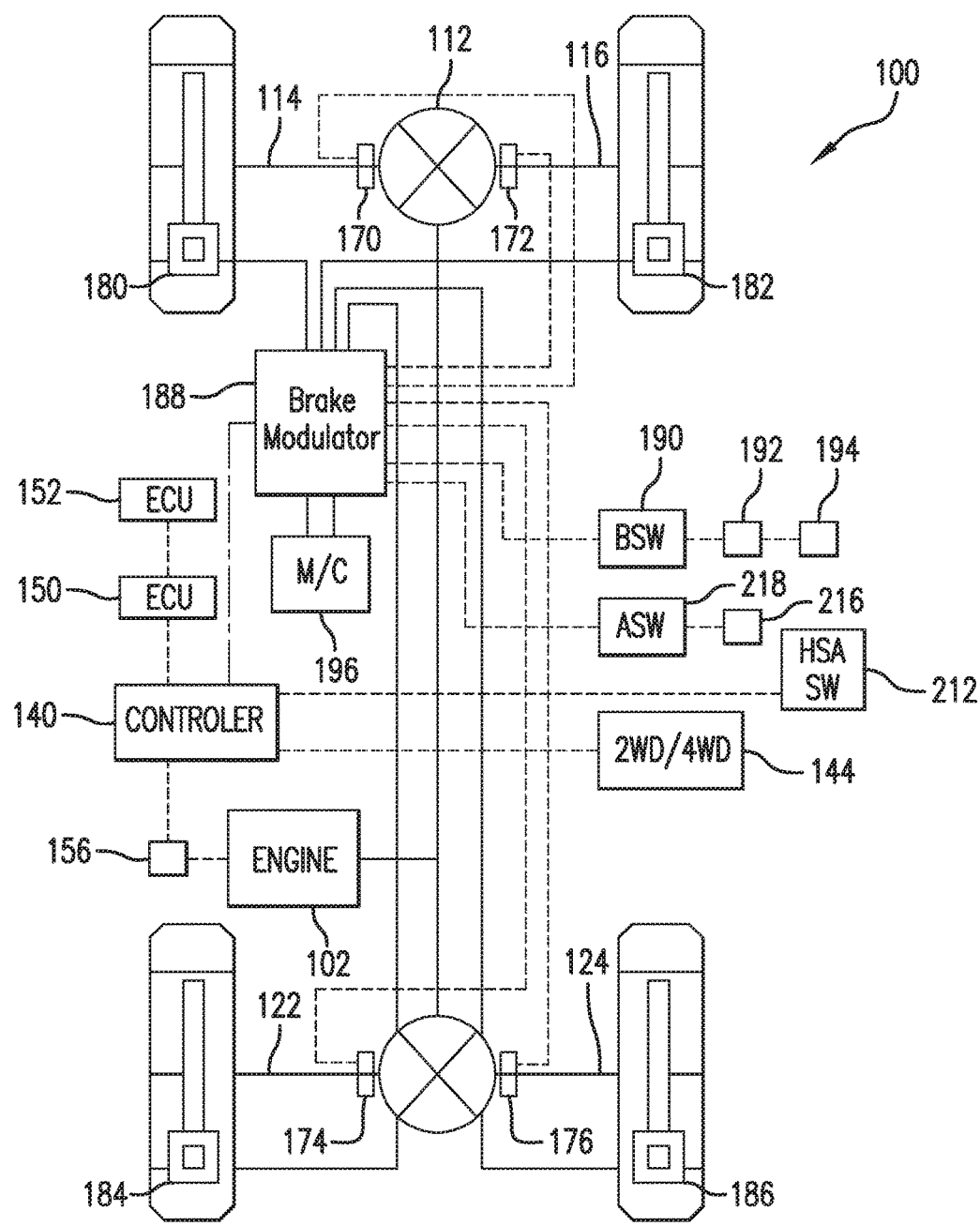
FIG. 1 is a schematic illustration of an off-road type vehicle including exemplary vehicle control systems according to the present disclosure.

The embodiments will now be described with reference to the accompanying drawings, wherein like reference numerals designate corresponding or identical elements throughout the various drawings. As schematically illustrated in FIG. 1, an off-road type vehicle 100 (e.g., all-terrain vehicle, multi-utility vehicle, side-by-side vehicle and other types of like utility vehicles) includes an engine 102 and a transmission (not shown) (e.g., an automatic transmission) disposed with the engine. A drive line 110 (e.g., a propeller shaft) transfers a driving force of the engine to front wheels W1 and W2 via a front differential 112 which distributes the driving force to left and right front drive shafts 114 and 116, and to rear wheels W3 and W4 via a rear differential 120 which distributes the driving force to left and right rear drive shafts 122 and 124. As is well known, a vehicle controller 140 can control the driving force distributed to the rear wheels W3 and W4 by selectively engaging or connecting the rear differential 120 so that the front wheels W1 and W2 serve as primary drive wheels and the rear wheels W3 and W4 serve as secondary drive wheels. That is, if the rear differential 120 is disengaged (disconnected), the driving force of the drive line 110 is not transferred to the rear differential 120 and, thus, the entire torque of the engine 102 is transferred to the front wheels W1 and W2. Accordingly, the vehicle is driven in a front-wheel drive mode (a 2WD mode). In contrast, if the rear differential 120 is engaged (connected), the driving force of the drive line 110 is transferred to the rear differential 120 and, thus, the torque of the engine is distributed to the front wheels W1 and W2 and the rear wheels W3 and W4. Accordingly, the vehicle 100 is driven in a four-wheel drive mode (a 4WD mode).

It should be appreciated that the exemplary off-road type vehicle 100 can travel while arbitrarily making the switch between front-wheel drive mode and four-wheel drive mode. By way of example, a 2WD/4WD switch 144 can be provided on a vehicle instrument panel (not shown) at a position where it can easily be operated by the vehicle operator. The vehicle controller 140 is in signal communication with the 2WD/4WD switch 144, such that when the 2WD/4WD switch 144 is manually actuated by the vehicle operator the rear differential 120 is engaged and, thus, the torque of the engine 102 is distributed to both the front wheels W1 and W2 and the rear wheels W3 and W4.

The vehicle 100 further includes a FI/AT (Fuel Injected/Automatic Transmission)-ECU (Electronic Control Unit) 150 and a VSA (Vehicle Stability Assist)-ECU 152, each being in communication with the other and the vehicle controller 140. As is well known, the FI/AT-ECU 150 serves as a control unit that controls the engine 102 and the automatic transmission. The FI/AT-ECU 150 can receives a detection signal of a throttle position or throttle opening detected by a throttle position sensor 156, a detection signal of an engine speed detected by an engine speed sensor (not shown), and a detection signal of a shift position detected by a shift position sensor (not shown). In addition, the FI/AT-ECU 150 can have an engine torque map that describes a relationship among the engine speed, the throttle position, and an engine torque estimation value. According to this aspect, the FI/AT-ECU 150 can calculate the engine torque estimation value on the basis of the throttle position detected by the throttle position sensor 156 and the engine speed detected by the engine speed sensor.

The VSA-ECU 152 is a control unit that has a BTCS (Brake Traction Control System) function that prevents tire slip in acceleration. With the BTCS of the exemplary off-road type vehicle 100, when terrain surface friction is different for the left and right wheels, brake control is applied to the wheel(s) on the low friction side while engine torque is supplied to the wheel(s) on the high-friction side, thus obtaining all wheel traction. The VSA-ECU 152 can also have an ABS (Anti-lock Braking System) function that prevents wheel lock by performing anti-lock control on the left and right front wheels W1 and W2 and the left and right rear wheels W3 and W4 when braking is applied. By controlling these functions, the VSA-ECU 152 can improve the stability characteristics of the vehicle 100.

Still further, the off-road type vehicle 100 includes a left front wheel speed sensor 170 that detects the wheel speed of the left front wheel W1 on the basis of the rotational speed of the left front drive shaft 114, a right front wheel speed sensor 172 that detects the wheel speed of the right front wheel W2 on the basis of the rotational speed of the right front drive shaft 116, a left rear wheel speed sensor 174 that detects the wheel speed of the left rear wheel W3 on the basis of the rotational speed of the left rear drive shaft 122, and a right rear wheel speed sensor 176 that detects the wheel speed of the right rear wheel W4 on the basis of the rotational speed of the right rear drive shaft 124. The four wheel speed sensors 170, 172, 174, 176 are in signal communication with the vehicle controller 140 and, in turn, each of the FI/AT-ECU 150 and VSA-ECU 152.

As indicated previously, the 2WD/4WD switch 144 is operably associated with the vehicle controller 140 allowing the vehicle operator to selectively switch between front-wheel drive (2WD) mode and four-wheel drive (4WD) mode. According to the present disclosure, the BTCS of the VSA-ECU 152 is only activated when the vehicle is in the 4WD mode. More particularly, when the vehicle 100 is in 2WD drive mode, the BTCS is inactive and brake control as described above is not applied to the left and right wheels. At Step S200 of FIG. 2, the state of 2WD/4WD switch 144 is determined by the vehicle controller 140. Upon the vehicle operator manually switching to 4WD mode via the 2WD/4WD switch 144 (i.e., 4WD mode is engaged), the VSA-ECU 152 continuously monitors certain conditions of the vehicle 100 at Step S202 prior to activating BTCS. According to one embodiment, the VSA-ECU 152 receives engine throttle position or opening information via serial communication with the FI/AT-ECU 150. The VSA-ECU 152 also receives detection signals output from the wheel speed sensors 170, 172, 174, 176, and wheel speed for each of the wheels W1, W2, W3, W4 is calculated. At Step S202 of FIG. 2, and upon the 4WD mode being engaged, the VSA-ECU 152 determines whether the throttle position or opening (as detected by the throttle position sensor 156) is greater than or equal to a predetermined throttle position or opening. According to one aspect, the predetermined throttle position or opening is approximately one (1) degree. At Step S202 the VSA-ECU 152 also compares the wheel speed between the left wheels W1, W3 and the right wheels W2, W4, and whether a wheel speed delta between of the left and right wheels is greater than a target wheel speed delta setting for the vehicle 100, which can be provided in a look-up table of the VSA-ECU 152.

Figure 2:
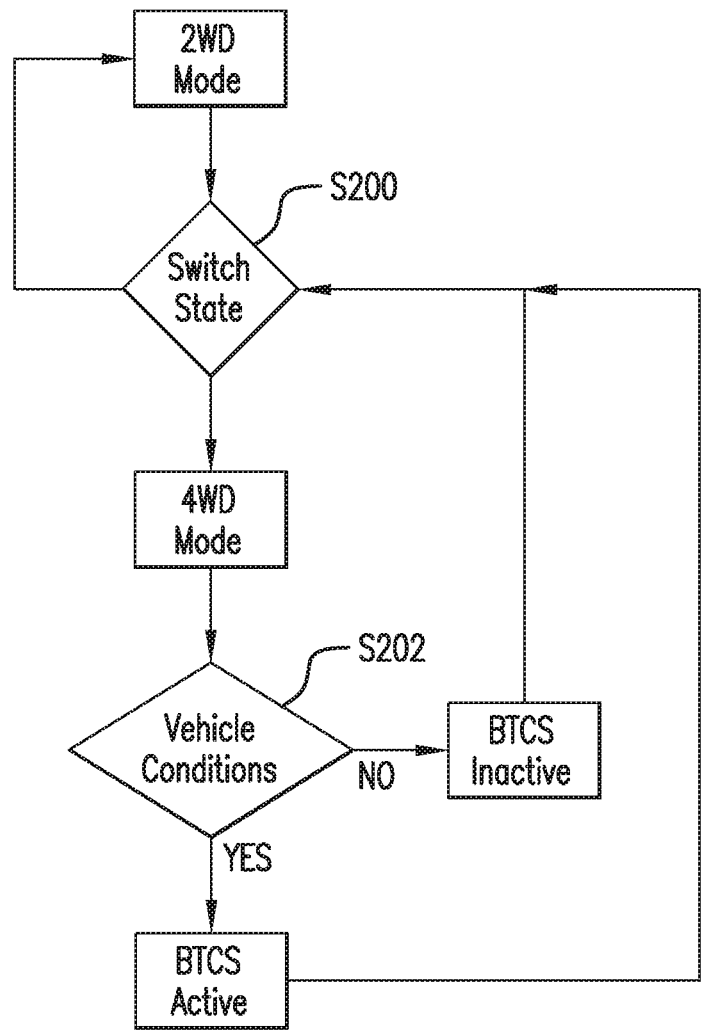
FIG. 2 is a flow diagram of an exemplary brake traction control for the vehicle of FIG. 1.

If it is determined at Step S202 of FIG. 2 that in the 4WD mode the throttle position or opening is greater than or equal to the predetermined throttle position or opening (e.g., approximately one degree) and the wheel speed delta between of the left and right wheels is greater than the target setting, the VSA-ECU 152 activates the BTCS. While the BTCS is active the VSA-ECU 152 continuously monitors the switch state, the throttle position or opening and the wheel speed delta. At Step S202 of FIG. 2, if the throttle position or opening as detected by the throttle position sensor 156 becomes less than the predetermined throttle position or opening (e.g., approximately one degree), the BTCS is inactive. Further, at Step S202, if the wheel speed delta becomes less than the target setting, the BTCS is inactive. Therefore, only when the 4WD mode is engaged and if both the throttle position and wheel speed delta conditions are met will the BTCS be activated by the VSA-ECU 152. Once so activated, the VSA-ECU 152 continuously monitors the throttle position or opening and wheel speed delta. If either of the throttle position or opening or the wheel speed delta falls below its respective predetermined threshold for the off-road type vehicle 100 and/or if the switch state changes back to 2WD mode, the VSA-ECU 152 deactivates the BTCS.

It should be appreciated from the foregoing that a method for selectively activating and controlling the BTCS of the VSA-ECU 152 for the off-road type vehicle 100 comprises providing the manually operable 2WD/4WD switch 144 having a first state for rear-wheel drive (2WD) mode and a second state for four-wheel drive (4WD) mode and determining whether the 2WD/4WD switch 144 is in the second state for four-wheel drive (4WD) mode. Wherein only if the vehicle 100 is in the four-wheel drive (4WD) mode, the method further comprises detecting throttle position or opening of the engine 102, and comparing the detected throttle position or opening with a predetermined throttle position or opening; calculating wheel speed for each of left wheels and right wheels, and comparing wheel speed between the left wheels and the right wheels; and activating the BTCS of the VSA-ECU 152 only if the detected throttle position or opening is greater than or equal to the predetermined throttle position or opening and a wheel speed delta between the left wheels and right wheels is greater than a target wheel speed delta setting for the vehicle 100.

While the BTCS of the VSA-ECU 152 is activated, the exemplary method further includes continuously monitoring the switch state and deactivating the BTCS if the 2WD/4WD switch 144 is moved back to the first state; and/or continuously monitoring the throttle position or opening and deactivating the BTCS if the detected throttle position or opening is less than the predetermined throttle position or opening; and/or continuously monitoring the wheel speed delta between the left wheels and right wheels and deactivating the BTCS if the wheel speed delta is less than the target wheel speed delta setting for the vehicle.

With reference back to FIG. 1, the off-road type vehicle 100 is further provided with a brake system including front wheel brakes 180, 182 for the respective left and right front wheels W1, W2 and rear wheel brakes 184, 186 for the respective left and right rear wheels W3, W4. The brake system further includes a brake modulator 188 (e.g., a brake control or regulatory valve), a manual brake switch or actuator 190 (i.e., brake pedal), a brake sensor 192, a brake light switch 194, and a master brake cylinder 196 (which is operably connected to the brake modulator 188). The brake sensor 192 is adapted to provide a signal indicating whether the front and rear vehicle brakes are in an engaged or disengaged condition (i.e., whether the manual brake actuator 190 is actuated or released) and is further adapted to provide a signal indicative of a master brake cylinder pressure. As is well known, the brake light switch 194 is an electrically powered switch that triggers brake lights to activate when the brakes are applied. The front and rear wheel brakes 180, 182, 184, 186 are operated by pressurized fluid such as air or a suitable brake fluid that is conveyed under pressure from the master brake cylinder 196 to respective wheel brake cylinders (not shown) that are mechanically linked to the brakes and operative to move the brakes into engagement when pressurized as is well known to those skilled in the art of vehicle brakes.

The brake system of the vehicle 100 can be controlled by the vehicle controller 140 and can receive detection signals output from the various sensors in signal communication with the respective FI/AT ECU 150 and VSA-ECU 152. The vehicle controller 140 is provided with a HSA (Hill Start Assist) system 210 for maintaining the off-road type vehicle 100 stationary (via, for example, front and rear wheel brakes 180, 182, 184, 186) while the vehicle is on a grade to permit the vehicle operator to start the vehicle in a desired direction of travel while preventing the vehicle from rolling in the opposite direction. In the embodiment illustrated in FIG. 1, the HSA system 210 is a manually operated system that can be selectively activated by the vehicle operator via a HSA switch 212, which can be located on the instrument panel, in addition to other vehicle operating conditions that have to be satisfied. Further associated with the present HSA system 210 are the wheel speed sensors 170, 172, 174, 176 and an acceleration pedal sensor 216 for detecting angular displacement of an acceleration switch or actuator 218 (i.e., acceleration pedal). As depicted, the detection signals output from the wheel speed sensors are sent to the vehicle controller 140.

Figure 3:
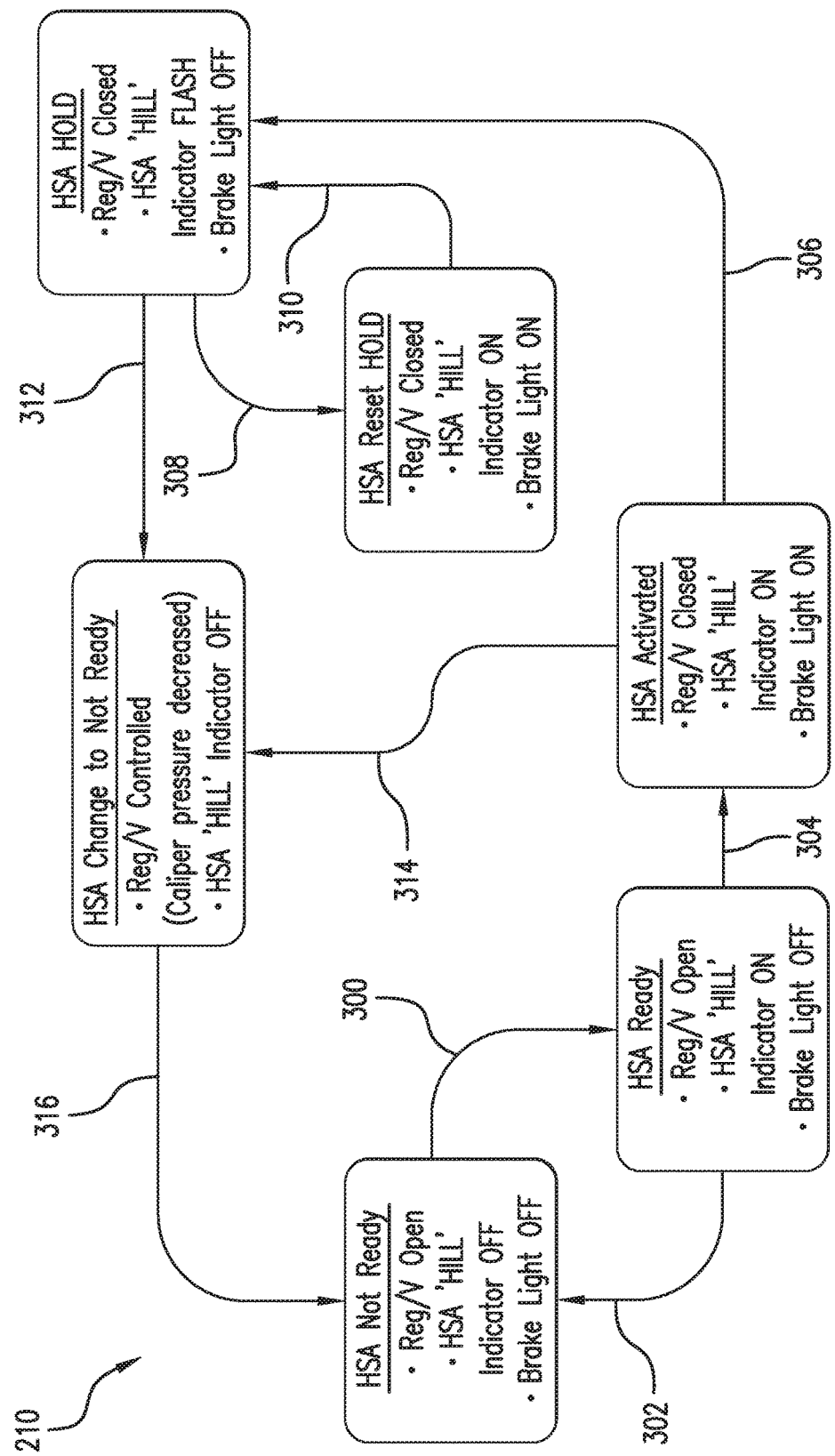
FIG. 3 is a state diagram of an exemplary Hill Start Assist (HSA) system for the vehicle of FIG. 1.

FIG. 3 depicts the various operational states of the exemplary HSA system 210, which are labeled for ease of description only. In the "HSA Not Ready" (i.e., deactivated) state, the brake modulator (i.e., brake control or regulation valve) 188 is open and an HSA "Hill" indicator 230 located on the instrument panel is not illuminated or off. At 300, the HSA system 210 moves to the "HSA Ready" state only when certain vehicle conditions associated with the HSA system 210 have been satisfied. Specifically, the HSA system 210 moves from the "HSA Not Ready" state to the "HSA Ready" state when the vehicle controller 140 confirms each of (1) the vehicle is stopped, (2) the manual brake actuator 190 is engaged, (3) the acceleration pedal 218 is released, (4) the HSA switch 212 has been manually activated by the vehicle operator (e.g. the HSA switch 212 is depressed by the vehicle operator for a predetermined time period), and (5) the brake light switch 194 is activated or on.

More particularly, the vehicle controller 140 receives detection signals output from the wheel speed sensors 170, 172, 174, 176 (and/or vehicle speed sensor 220), and verifies that wheel speed for each of the wheels W1, W2, W3, W4 is approximately equal to 0 km/h (i.e., that the vehicle 100 is stopped or not moving for a predetermined time period). The vehicle controller 140 receives detection signals from the brake sensor 192 that are indicative of one of an angular displacement of the manual brake actuator 190 (i.e., brake pedal) and pressure of the master brake cylinder 196. According to one aspect, the vehicle controller 140 receives a signal from the brake sensor 192 that pressure of the master brake cylinder 196 is greater than a defined pressure amount. The vehicle controller 140 further receives detection signals from the pedal sensor 216 that angular displacement of the acceleration pedal 218 is less than a defined angle amount. Further, the vehicle controller 140 verifies that the HSA switch 212 and a brake light switch 194 are on. According to another aspect, and as a further requirement of the "HSA Ready" state, the vehicle controller 140 determines that each of the above conditions have been met for a time period greater than a predetermined time.

It should be appreciated that while in the "HSA Ready" state, the vehicle controller 140 continues to monitor the vehicle conditions described above. And at 302 of FIG. 3, if the vehicle controller 140 receives a signal from (1) the wheel speed sensors 170, 172, 174, 176 that wheel speed for the wheels W1, W2, W3, W4 is greater than 0 km/h (i.e., that the vehicle 100 is moving), (2) the pedal sensor 216 that angular displacement of the acceleration pedal 218 is greater than approximately zero degrees, and/or (3) the HSA switch 212 is again activated by the vehicle operator after being released once, the HSA system 210 moves back to the "HSA Not Ready" state.

In the "HSA Ready" state, the brake modulator 188 is open and the HSA "Hill" indicator 230 is illuminated or on. At 304, the HSA system 210 moves to the "HSA Activated" state when the vehicle controller 140 confirms that the condition of the manual brake actuator 190 (i.e., brake pedal) described above remains. In the "HSA Activated" state the brake modulator 188 is closed and master brake cylinder pressure begins to release. And the HSA "Hill" indicator 230 remains illuminated or on.

At 306 of FIG. 3, the HSA system 210 moves from the "HSA Activated" state to the "HSA Hold" state. The vehicle controller 140 receives detection signals from the brake sensor 192 that the manual brake actuator 190 is released and/or pressure of the master brake cylinder 196 is less than or equal to the defined pressure amount. Alternatively, at 306 of FIG. 3 the vehicle controller 140 determines that the brake light switch 194 is not activated or off. If one of these conditions is determined by the vehicle controller 140, the HSA system 210 moves to the "HSA Hold" state, wherein the brake modulator 188 remains closed and a start hold timer begins for a defined period of time. Further, in the "HSA Hold" state of the HSA system 210 the HSA "Hill" indicator 230 flashes for the period of the start hold timer.

It should be appreciated that the vehicle controller 140 continues to monitor the vehicle conditions required for the "HSA Hold" state of the HSA system 210. In the event that at 308 of FIG. 3 the vehicle controller 140 receives detection signals from the brake sensor 192 that the manual brake actuator 190 is again pressed and/or pressure of the master brake cylinder 196 is greater than the defined hold pressure or that the brake light switch 194 is again activated or on, the HSA system 210 moves to a "HSA Reset Hold" state. While in the "HSA Reset Hold" state, the vehicle controller 140 continues to monitor the vehicle conditions described above. And at 310 of FIG. 3, if the vehicle controller 140 determines that the conditions for transitioning from the "HSA Activated" state to the "HSA Hold" state described at 306 are again satisfied, the HSA system 210 moves back to the "HSA Hold" state.

At 312 of FIG. 3, the HSA system 210 begins to transition from the "HSA Hold" state to its "HSA Change to Not Ready" state, which slowly decreases brake caliper pressure by control of the brake modulator 188 (e.g., brake control or regulatory valve). This transition occurs when the vehicle controller 140 receives a signal from (1) the pedal sensor 216 that angular displacement of the acceleration pedal 218 is greater than the defined angle amount, (2) the HSA switch 212 is again activated by the vehicle operator after being released once, and/or (3) the time period of the start hold timer elapsed. It should also be appreciated that the HSA system 210 can move from the "HSA Activated" state to the "HSA Change to Not Ready" state upon determination by the vehicle controller 140 of these same vehicle conditions (at 314 of FIG. 3). Finally, at 316 of FIG. 3, the HSA system 210 moves back to the "HSA Not Ready" state and the brake modulator 188 is opened completely.

Therefore, as is evident from the foregoing description of the exemplary HSA system 210 for the off-road type vehicle 100, if the vehicle operator requests a HSA operation to hold the vehicle 100 on an incline/decline, the HSA system 210 holds brake pressure in order to prevent the vehicle from moving. The HSA system 200 generally controls the brake pressure for a predetermined period of time after the vehicle operator applies HSA switch 212 and has released the manual brake actuator 190, or until the accelerator pedal 218 is applied. It should be appreciated that the vehicle operator can stop operation of the HSA system 210 at any time by again depressing the HSA switch 212. Accordingly, there is provided a variety of inputs for actuating and deactivating the exemplary HSA system 210, none of which are sensors for detecting vehicle position angle or slope. In other words, the HSA system 210 is operable without regard to position angle or slope sensors.

FIG. 3 depicts illumination of the HSA "Hill" indicator 230 during operation of the HSA system 210, particularly at the identified states of the HSA system 210. In FIG. 3, the HSA "Hill" indicator 230 is in the on condition in the "HSA Ready" state until brake pressure is released, and is in the intermittent on condition in the "HSA Hold" state. Therefore, the present disclosure provides an indication signal that is illuminated when the HSA system 210 is ready and activated (as described in detail above) and then flashes when the vehicle 100 is being held by the HSA system 210.

As is evident from the foregoing, an exemplary method of controlling the HSA system 210 for the off-road type vehicle 100 is provided. The method generally comprises controlling a brake modulator of a brake system to maintain a braking force sufficient to maintain the vehicle 100 in a stopped condition when a manual brake actuator of the brake system is in a released position; transitioning the HSA system 210 from a deactivated state to a ready state by determining that the vehicle is in the stopped condition, the manual brake actuator is in an engaged position, an acceleration pedal is in a released position, and a HSA switch 212 is manually activated by an associated vehicle operator; transitioning the HSA system 210 from the ready state to an activated state where the brake modulator is in a closed condition and the braking force is maintained; transitioning the HSA system 210 from the activated state to a hold state where the brake modulator remains in the closed position by determining that the manual brake actuator is in the released position; and transitioning the HSA system 210 from the hold state back to the deactivated state.

As described in detail above, transitioning the HSA system 210 from the activated state to a hold state is based on determining the manual brake actuator is in the released position. The exemplary method further comprises transitioning the HSA system 210 from the hold state to the activated state is based on determining the manual brake actuator is in the engaged position; transitioning the HSA system 210 from any one of the ready, activated and hold states to the deactivated state based on determining one of the HSA switch 212 is again activated by the associated vehicle driver, the vehicle not being in the stopped and the acceleration pedal is in a depressed position; and transitioning the HSA system 210 from any one of the activated state and the hold state to the deactivated state based on determining that a time period is expired.

It should be appreciated that any suitable controller and/or electronic control unit which acts to receive the desired inputs and calculate the desired outputs may be employed for the vehicle controller 140, FI/AT ECU 150 and VSA-ECU 152. It should be further appreciated by one skilled in the vehicle control arts that each of the vehicle controller 140, FI/AT ECU 150 and VSA-ECU 152 can be formed from a microcomputer or processor including a random access memory (RAM), a read only memory (ROM), a central processing unit (CPU), and an I/O interface (none are illustrated), wherein the controller and ECUs execute software implemented functions to control operation of the vehicle 100. It should be further appreciated that although each of the vehicle controller 140, FI/AT ECU 150 and VSA-ECU 152 are depicted as separate control units, each can be selectively integrated into a single controller or control unit. Still further, insofar as each of the vehicle controller 140, FI/AT ECU 150 and VSA-ECU 152 is disclosed as a singular microcomputer or processor it is to be appreciated that each may be composed of several processors or controllers. Further still, it is also to be appreciated that each of the vehicle controller 140, FI/AT ECU 150 and VSA-ECU 152 may include various other modules or components configured to perform other vehicle control related functions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A Brake Traction Control System (BTCS) for an off-road type vehicle operable in one of a two-wheel drive mode (2WD) and a four-wheel drive mode (4WD) comprising:
   a 2WD/4WD switch adapted to switch a drive mode of the vehicle between a two-wheel drive mode (2WD) and a four-wheel drive mode (4WD), the switch configured to be manually activated by an associated vehicle operator; and
   a control unit in signal communication with the 2WD/4WD switch, the control unit operable to activate the BTCS only if the drive mode is switched to the four-wheel drive mode and predetermined vehicle operating conditions relating to engine throttle position or opening and wheel speed are subsequently satisfied,
   wherein the control unit is in signal communication with a throttle position sensor for detecting engine throttle position or opening and with left and right wheel speed sensors for detecting wheel speed for left wheels and right wheels, wherein in the four-wheel drive mode the control unit is operable to activate the BTCS only if the detected throttle position or opening is greater than or equal to a predetermined throttle position or opening and a wheel speed delta between the left wheels and right wheels is greater than a target wheel speed delta setting for the vehicle.

2. The system of claim 1, wherein in the four-wheel drive mode the control unit is operable to deactivate the BTCS if the detected throttle position or opening is less than the predetermined throttle position or opening.

3. The system of claim 2, wherein the predetermined throttle position or opening is approximately one degree.

4. The system of claim 1, wherein in the four-wheel drive mode the control unit is operable to deactivate the BTCS if the wheel speed delta between the left wheels and right wheels is greater than the target wheel speed delta setting for the vehicle.

5. The system of claim 4, wherein the target wheel speed delta for the vehicle is provided in a look up table of the control unit.

6. The system of claim 1, wherein in the four-wheel drive mode the control unit is operable to deactivate the BTCS if the drive mode is manually switched back to the two-wheel drive mode via the 2WD/4WD switch.

7. A method of controlling a Brake Traction Control System (BTCS) for an off-road type vehicle operable in one of a two-wheel drive mode (2WD) and a four-wheel drive mode (4WD) comprising:
   providing a manually operable 2WD/4WD switch having a first state for front-wheel drive (2WD) mode and a second state for four-wheel drive (4WD) mode;
   determining whether the 2WD/4WD switch is in the second state for four-wheel drive (4WD) mode, wherein only if the vehicle is in the four-wheel drive (4WD) mode, the method further comprises:
   detecting throttle position or opening of an engine, and comparing the detected throttle position or opening with a predetermined throttle position or opening;
   calculating wheel speed for each of left wheels and right wheels, and comparing wheel speed between the left wheels and the right wheels; and
   activating the BTCS only if the detected throttle position or opening is greater than or equal to the predetermined throttle position or opening and a wheel speed delta between the left wheels and right wheels is greater than a target wheel speed delta setting for the vehicle.

8. The method of claim 7, wherein while the BTCS is activated, further including continuously monitoring the switch state and deactivating the BTCS if the 2WD/4WD switch is moved back to the first state.

9. The method of claim 7, wherein while the BTCS is activated, further including continuously monitoring the throttle position or opening and deactivating the BTCS if the detected throttle position or opening is less than the predetermined throttle position or opening.

10. The method of claim 9, wherein the predetermined throttle position or opening is approximately one degree.

11. The method of claim 7, wherein while the BTCS is activated, further including continuously monitoring the wheel speed delta between the left wheels and right wheels and deactivating the BTCS if the wheel speed delta is less than the target wheel speed delta setting for the vehicle.

12. The method of claim 7, wherein while the BTCS is activated, further including continuously monitoring both the throttle position or opening and the wheel speed delta between the left wheels and right wheels and deactivating the BTCS if both the detected throttle position or opening is less than the predetermined throttle position or opening and the wheel speed delta is less than the target wheel speed delta setting for the vehicle.

13. An off-road type vehicle operable in one of a two-wheel drive mode (2WD) and a four-wheel drive mode (4WD) comprising:
   an engine;
   a drive line for transferring a driving force of the engine to left and right front wheels via a front differential and to left and right rear wheels via a rear differential;
   a manual 2WD/4WD switch adapted to switch a drive mode of the vehicle between a two-wheel drive mode (2WD) and a four-wheel drive mode (4WD); and
   a control unit configured to control the driving force distributed to the rear wheels by selectively engaging or connecting the rear differential, the control unit being in communication with the 2WD/4WD switch such that when the switch is manually actuated to switch the drive mode to the four-wheel drive mode (4WD) the rear differential is engaged and engine torque is distributed to both the front wheels and the rear wheels, wherein the control unit includes a Brake Traction Control System (BTCS) that is selectively activated only if the drive mode is manually switched to the four-wheel drive mode, wherein the control unit is in signal communication with a throttle position sensor for detecting throttle position or opening of the engine and with left and right wheel speed sensors for detecting wheel speed for the left front and rear wheels and right front and rear wheels, wherein in the four-wheel drive mode (4WD) the control unit is operable to activate the BTCS only if the detected throttle position or opening is greater than or equal to a predetermined throttle position or opening and a wheel speed delta between the left front and rear wheels and a wheel speed delta between the right front and rear wheels are each greater than a target wheel speed delta setting for the vehicle.

14. The vehicle of claim 13, wherein in the four-wheel drive mode (4WD) the control unit is operable to deactivate the BTCS if at least one of the detected throttle position or opening is less than the predetermined throttle position or opening and the wheel speed delta between the left wheels and right wheels is greater than the target wheel speed delta setting for the vehicle.

* * * * *